United States Patent [19]

Ossi

[11] Patent Number: 4,651,521
[45] Date of Patent: Mar. 24, 1987

[54] CONVERTIBLE TURBO-FAN, TURBO-SHAFT AIRCRAFT PROPULSION SYSTEM

[75] Inventor: Ronald R. Ossi, Milford, Conn.

[73] Assignee: Avco Corporation, Stratford, Conn.

[21] Appl. No.: 800,200

[22] Filed: Nov. 21, 1985

[51] Int. Cl.⁴ .............................................. F02K 3/04
[52] U.S. Cl. ................................. 60/226.3; 60/39.161
[58] Field of Search ............... 60/39.161, 39.163, 39.2, 60/39.33, 226.1, 226.3

[56] References Cited

U.S. PATENT DOCUMENTS

| | | | |
|---|---|---|---|
| 3,025,025 | 3/1962 | Duttmann | 60/226.1 |
| 3,375,997 | 4/1968 | Gist | 60/226.1 |
| 3,520,138 | 7/1970 | Fox | 60/226.1 |
| 3,678,690 | 7/1972 | Shohet et al. | 60/39.17 |
| 3,731,483 | 5/1973 | Hill | 60/39.163 |
| 3,792,586 | 2/1974 | Kasmarik | 60/226.1 |

Primary Examiner—Louis J. Casaregola
Attorney, Agent, or Firm—Ralph D. Gelling

[57] ABSTRACT

A composite turbo-fan/turbo-shaft gas turbine engine system is provided wherein the fan is driven through a variable geometry torque coverter whose input is driven by the turbine power shaft supplied through a reduction gear. Actuation of the variable geometry of the torque converter provides a wide variety of operating modes including all power to the power output shaft and combinations in between.

11 Claims, 3 Drawing Figures

CONVERTIBLE TURBO-FAN, TURBO-SHAFT AIRCRAFT PROPULSION SYSTEM

BACKGROUND OF THE INVENTION

This invention pertains to a composite turbo-fan and turbo-shaft engine which is capable of operating in either a thrust generating mode or a shaft horsepower mode or combinations of both output modes. An engine which is convertible between thrust and shaft horsepower modes may be used to power the rotor of a rotary wing aircraft during liftoff; then, once the craft is airborne, gradually may be switched to its thrust mode for forward flight. Also, in turbo-fan powered multi-engined aircraft, which make use of powered lift concepts, a selective redistribution of shaft power to the fans of such engines on opposite sides of the wing may be used to effect roll control of the aircraft at low flight speeds when conventional aerodynamic control surfaces may be ineffective.

Three specific operational conditions exist with a composite turbo-fan and turbo-shaft engine namely, one hundred percent propulsive thrust, one hundred percent shaft power output, and a split between the two. A constant output shaft speed is generally required in rotary wing applications. Therefore, in order to accomplish the various modes of operation with both the propulsion fan and shaft output powered by the same turbine, a mechanism is required which will provide a smooth transition between operating modes and a means to balance the load distribution between turbo-fan and turbo-shaft outputs. Generally, the balancing may be achieved by load control over both the fan and shaft output. In rotary wing aircraft, the rotor flight control system, namely collective pitch, will provide this function. In the prior art cited herein, the fan may be rigidly connected to the gas turbine shaft operating at constant speed, and fan power requirements are usually controlled by aerodynamically unloading the fan by various expensive devices, for example: variable inlet and outlet guide vanes, blade pitch change, selective direction or splitting of the hot gas stream to turbines dedicated to the different functions. In this invention, however, fan power absorption is regulated by controlling the fan speed of a fixed pitch fan by means of the relatively more economical infinitely variable speed-ratio hydrodynamic torque converter transmission. This mechanism provides a very flexible way of selecting a variety of modes and combinations of modes with a smooth transition between them while driving the turbo-fan and turbo-shaft outputs with the same turbine.

PRIOR ART

U.S. Pat. No. 3,678,690 to Shohet et al, discloses a convertible composite engine capable of providing either shaft horsepower or thrust generation or a split between the two modes. Shohet et al teaches a convertible composite engine which is concentric about a single center line. The output of the gas generator powers a turbine which drives the compressor. Downstream of this turbine, the gas stream is divided. One part of the gas stream powers a turbine which powers the fan stage. The other part of the gas stream powers a turbine which provides power on a Power Take Off shaft via a 90 degree bevel gear set. Means are included for throttling the gas streams. The throttling action provides a variable power splitting provision between the thrust generating and shaft power mode of operation.

U.S. Pat. No. 3,520,138 to Fox discloses a convertible engine having one turbine which drives a fan stage and another turbine which powers an output shaft. Means are included for diverting the gas flow around each turbine and at the same time varying the pressure ratio across each turbine. Control of the vanes which accomplish the diverting action makes it possible to control the power output between the fan and the shaft power modes.

U.S. Pat. No. 4,222,235 to Adamson, et al discloses a variable cycle turbo-shaft engine which includes a remote fan system and respective high and low pressure systems for selectively driving the fan system to provide a Vertical Take-Off and Landing (VTOL) capability and minimum specific fuel consumption at cruise and loiter conditions.

None of this prior art teaches a convertible turbo-fan and turbo-shaft engine having a single power turbine and a fixed pitch propulsion fan driven through a torque converter which is constructed to control the speed of the fan. The excess power, over the fan requirements', is available on the power take-off shaft for rotary wing or cross-shafted operation. The torque converter also allows complete disconnection of the fan stage in order to permit the availability of full power at the power shaft. The torque converter provides easy re-engagement of the fan stage and selective division of power between the power take-off shaft and the propulsion fan.

SUMMARY OF INVENTION

A primary object of this invention is to provide an improved convertible engine capable of operating in either a thrust generating or shaft horsepower mode of operation. Further, the engine can be adjusted to provide any desired division of power between the mechanical power take-off and the propulsion fan.

The turbo-fan engine of this invention is typical of high bypass ratio turbo-fan engines in that it is constructed with a circumferential bypass duct defined by outer and inner shrouded frames to which the core engine is fixed. Incoming air is pressurized by a fan mounted at the engine inlet. Downstream of the fan, the pressurized air is divided between a transition passage which supplies air to the compressor section of the core and the bypass duct which provides air for propulsive thrust. Compressed air from the compressor passes through a diffuser and is supplied to a combustor. Fuel is added in the combustor and the pressurized gas drives a high pressure turbine. The high pressure turbine powers the compressor.

Downstream of the high pressure turbine is an annular passage which supplies a hot gas stream to a low pressure turbine which drives a power shaft. The turbine drive shaft is connected through a bevel gear to a shaft which can be used to drive a rotor system or may be cross-shafted to other like engines.

The power turbine shaft also connects with and drives a reduction gear system which is used to match the optimum low pressure turbine speed with that of the propulsion fan. The reduction gear set is a planetary type with a sun gear on the power turbine shaft, a number of planet gears surrounding the sun gear and positioned by a carrier which is fixed to the engine frame, and an internal bell gear which surrounds the planets and constitutes the power output element of the system. A generic, rotating housing, variable torque absorption capacity, hydrodynamic torque converter is driven by the bell gear and is installed within the fan spinner. The fan itself is physically located between the torque converter and the reduction gear set. An optional fan rotor brake may be used to stop or prevent fan rotation by grounding the fan rotor to the engine frame. The gear reducer output bell gear drives the impeller element of the torque converter. The Torque converter turbine couples to and drives the fan. A mechanical projection from the turbine portion of the torque converter allows the inclusion of a multiple disc, direct drive clutch between the impeller and turbine elements.

To facilitate the cooling of the torque converter, the torque converter is placed in the hub spinner, to allow direct cooling of the converter by the incoming airstream.

BRIEF DESCRIPTION OF THE DRAWING

This invention is more particularly described with reference to the attached drawing and in said drawing.

DESCRIPTION OF THE PREFERRED EMBODIMENT

Figure 1:
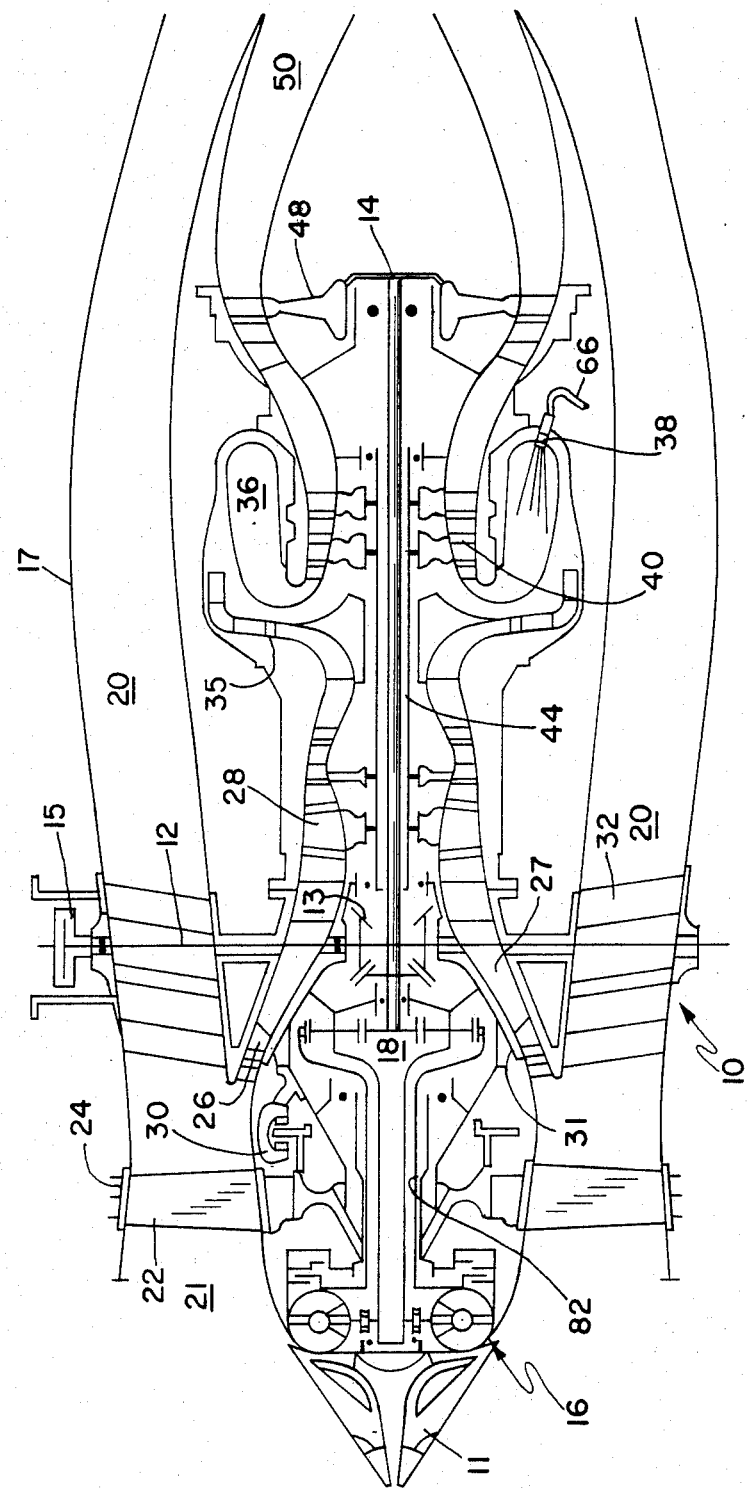
FIG. 1 is a sectional schematic view of a turbo-fan engine having the power transmission system of this invention.

Referring to FIG. 1 there is shown a composite turbo-fan and turbo-shaft gas turbine engine 10 having an airflow path consisting of an inlet 21, a bypass duct 20, a transition duct 26 which carries air to a compressor 28, diffuser 35, combustor 36, compressor turbine 40 and power turbine 48 arranged in a conventional manner to generate usable power onto power turbine drive shaft 14.

Pressurized air from diffuser 35 flows into combustor 36. Fuel from supply lines 66 is injected into combustor 36 via fuel nozzles 38. The hot pressurized gas flows into high pressure turbine 40 which drives compressor 28 through shaft 44. Downstream of the high pressure turbine 40 is low pressure turbine 48 which drives power turbine shaft 14. The exhaust gases escape the engine through nozzle 50.

Power turbine shaft 14 is connected through a bevel gear 13 to a power take-off shaft 12 which may be connected to an output load, for example, a rotor system. A clutch 15 may be provided to isolate the load under certain conditions. Shaft 14 is also operatively connected through a gear reduction system 18 to the input shaft 82 of a torque converter 16.

Figure 3:
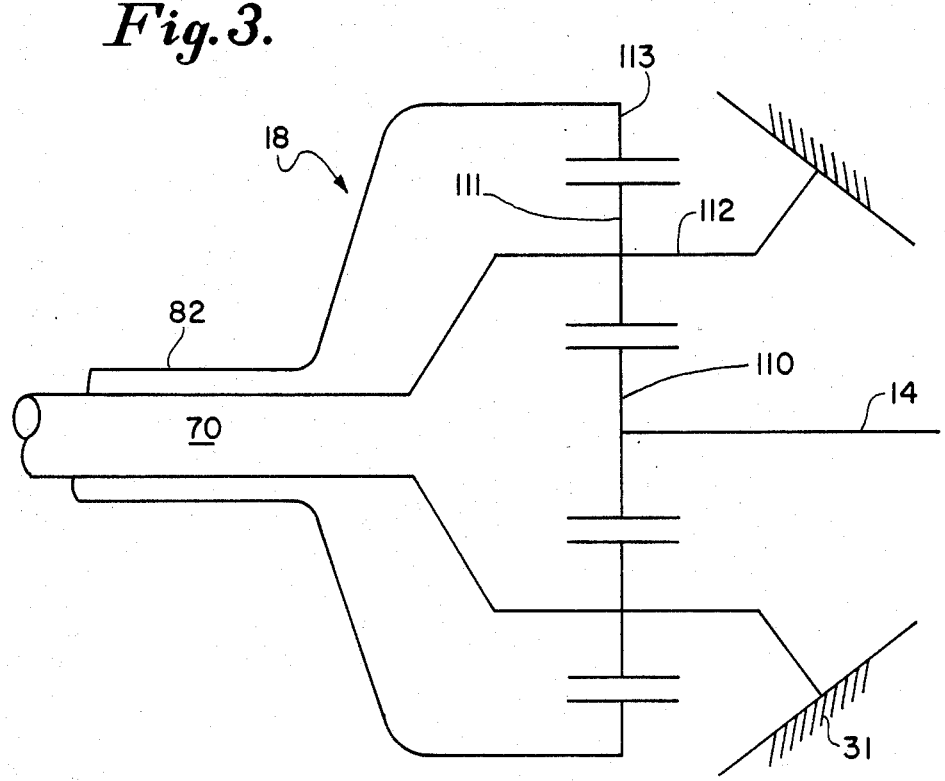
FIG. 3 is a schematic drawing of the reduction gear system of this invention.

As shown schematically in FIG. 3 gear reduction system 18, a sun gear 110 is fixed to turbine output shaft 14 for rotation therewith. A set of planet gears 111 is mounted for engagement with sun gear 110 in carrier 112 which is fixed to the fan frame 31. Bell gear 113 is mounted for rotation with hollow shaft 82 which forms the output of the gear reduction system 18. The fixed planet gear carrier 112 is connected to shaft 70 on which the converter turbine 86 is rotatably mounted. Fixed shaft 70 extends through hollow shaft 82. This arrangement provides a convenient means to fix shaft 70 to the frame without significant modification of the interconnected parts.

An annular bypass duct 20 is constructed surrounding the core engine within an outer shroud 17. Engine inlet 21 allows the introduction of air to the system. A fan 22 is mounted within the fan shroud 24 and is powered by power turbine shaft 14 through reduction gear 18 and the torque converter 16. A brake 30 may be provided to stop free spinning under some conditions. Fan 22 pressurizes the air entering inlet 21 which is then distributed between bypass duct 20 and transition duct 26 to provide thrust and usable shaft power respectively. The core engine is supported across the air passageways, namely bypass duct 20, and transition duct 26 by struts 27 and 32. This provides a fixed frame for external mounting and internal support. The aerodynamic hub or spinner 11 is provided with special cooling air flow which may be constructed to extract heat from the converter and reject it into the inlet air flow.

Figure 2:
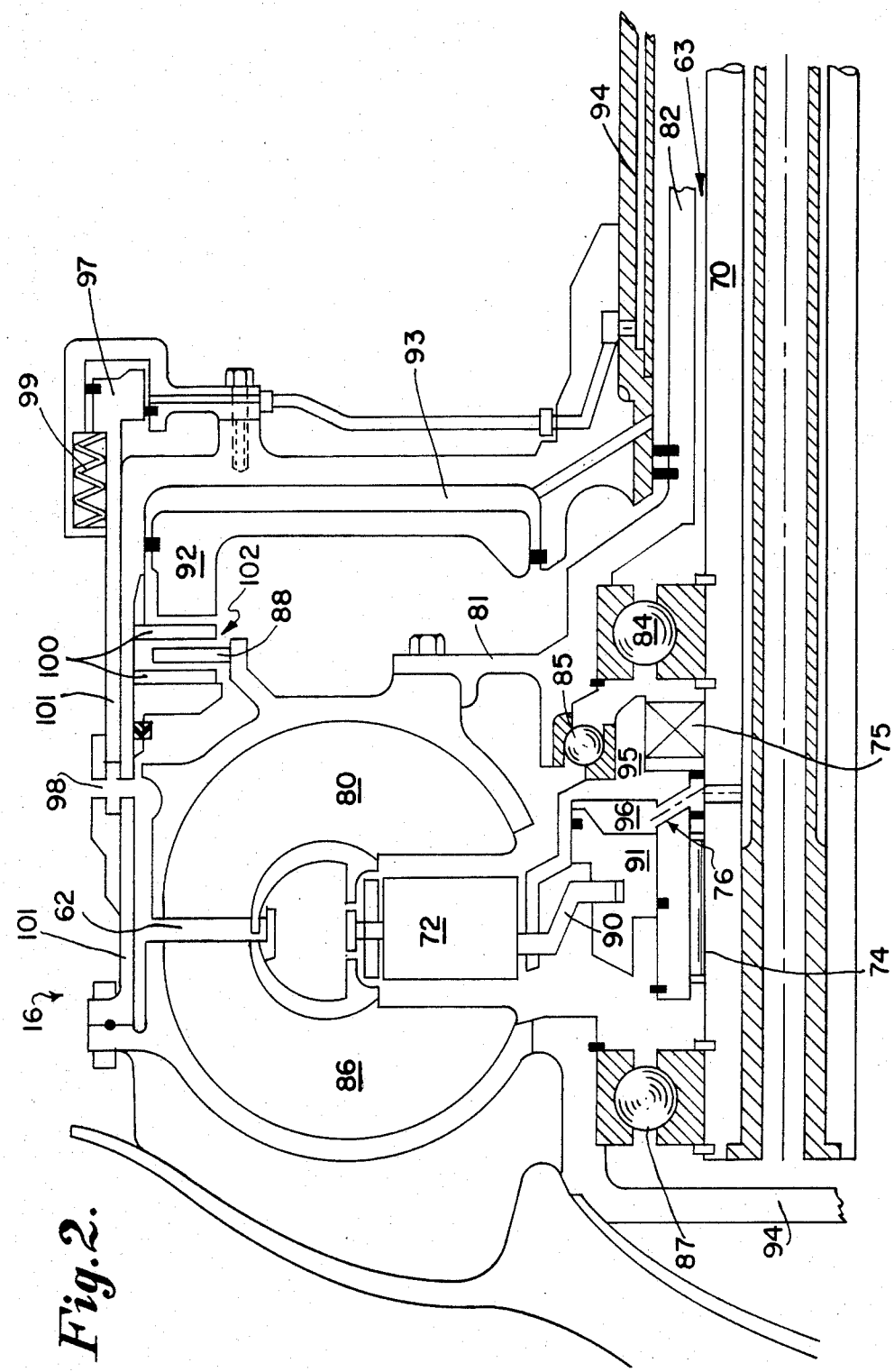
FIG. 2 is a sectional schematic view of a torque converter used in this invention.

Torque converter 16 is shown in more detail in FIG. 2 and is a rotating housing, variable geometry hydrodynamic design. Converter 16 is mounted within the spinner of the fan module to provide easy access and allow for cooling. Converter 16 is constructed with a fluid chamber 62 within housing 101, said chamber being connected to a source of operating fluid such as oil through passage 63 in shaft 82. The impeller 80 is mounted within chamber 62 and secured by bolts to a collar 81 on the end of input shaft 82. Input shaft 82 is driven by the output of gear reduction system 18. Variable geometry stators 72 and the stator assembly 95 are mounted in the fluid chamber 62 for rotation on fixed shaft 70 by bearing 74. One-way clutch 75 allows stator assembly 95 to rotate only in the direction of rotation of the impeller and turbine.

Fluid actuated, stator pitch changing mechanism 76, composed of individual vanes 72 with cranks 90 and a control piston 91, is housed within the stator hub 95. Signal pressure in cavity 96 reacting against control piston 91 collectively positions stator vanes 72. Shaft 82 and impeller 80 are mounted for rotation on shaft 70 by means of bearing 84. The turbine 86 of the torque converter is mounted for rotation with housing 101 by means of ball bearing 87. Thrust bearing 85 carries stator thrust to ground through bearing 84. Torque converter 16 contains a direct drive clutch mechanism 102 which includes a disk 88 attached for rotation to the impeller 80. Disk 88 engages friction disks 100, extending inward from converter housing 101, when clutch 102 is engaged by an annular piston 92 which is operated by fluid pressure in cavity 93. The direct drive clutch mechanism 102 may be hydraulically operated with engagement being controlled automatically as a function of engine operating conditions. Fan 22 is driven by the output shaft 94 from turbine 86.

In operation valve 97, operated by pressure in sensing conduit 103, will close discharge port 98 allowing converter 16 to be filled with fluid (lube oil, fuel oil, or other appropriate substance) by supply passage 63. Spring 99 will open valve 97 to spill fluid from converter 16 when control pressure is released.

OPERATION OF THE INVENTION

Initially the system of this invention will be used to supply full power to the rotor system for lift off. During this mode of operation the clutch 102 will be disengaged and the converter chamber is evacuated of fluid and/or the stator vanes completely closed to unload output shaft 94 from input shaft 82. All power from turbine drive shaft 14 will then be supplied to the rotor system. As the aircraft becomes airborne and forward propulsion is required, the converter is filled with fluid and the variable geometry stator 72 is actuated to gradually increase power to the fan 22 to a selected combination of fan thrust and output shaft power. This must be accompanied by an appropriate reduction in output shaft load to provide power for the fan. In rotary wing aircraft, this can be accomplished through the collective pitch mechanism. After full thrust is reached by the fan, the load on the power output shaft 12 may be disengaged by clutch 15 and the rotor allowed to autogyrate. The direct drive clutch 102 of the torque converter 16 may be engaged to lock converter output shaft 94 to converter input shaft 82 for mutual rotation driven by turbine drive shaft 14.

During forward flight with full thrust, the torque converter 16 is mechanically by-passed. The fan is directly driven by the drive shaft 14 and there is no load on the power output shaft 12. When it becomes necessary for the aircraft to set down, the output shaft clutch 15 is engaged with the rotor pitch adjusted for minimum load. The converter 16 will then be activated by disengaging clutch 102. The variable geometry stator 72 will be actuated to decrease fan speed while the aircraft rotor system is regulated to absorb the available power as it is off-loaded from the fan. When the fan speed is reduced to negligible thrust, the converter 16 may be evacuated to release the fan from the power turbine shaft 14. The optional brake 30 may be actuated to lock the fan.

It can be observed that a wide variety of combined modes of operation can be achieved through this system by varying shaft output load, engine fuel flow, power turbine speed and employment of the various torque converter operating features. The converter 16, therefore, coupled with the direct drive clutch 102, variable stators 72, and reduction gear 18 allows for an effective means of achieving the various modes and providing a smooth transition between them.

Since a significant amount of heat may be generated by the operation of torque converter 16, it is desirable that it be placed in spinner hub 11 of the fan 22. By providing for the flow of external air over the hub, the torque converter 16 may be cooled. The mechanical position of the converter relative to the fan and gear reduction provides this added benefit.

The basic system of this invention, namely, a turbo-fan engine having a fan module driven by a turbine through a gear reduction system and a torque converter and having a power output shaft driven by the same turbine, may also be beneficially used in multi-engine applications where balancing of engine loads on alternate sides of the aircraft is advantageous. In this instance, identically designed turbo-fan engines would be mounted on the aircraft and mechanically interconnected through the power output shaft 12. This invention allows a full range of variation of the relative operation of the interconnected engines.

What is claimed is:

1. A composite gas turbine engine propulsion system for aircraft which includes a propulsion fan for providing forward thrust as a first mode of operation and a turbo-shaft power output for driving an external load as a second mode of operation and means for selectably changing between said modes of operation and combinations thereof comprising:

a gas turbine engine mounted to a frame providing power to a drive shaft;

first transmission means connected to the drive shaft for providing a power output suitable for driving the external load;

second transmission means connected to the drive shaft for providing a variable power output suitable for driving the propulsion fan, said second transmission comprising;

a gear reduction system operatively connected to the drive shaft and constructed to provide output power to an output shaft suitable for driving the fan, said gear reduction system comprising a sun gear operatively connected for rotation with the drive shaft;

a planet gear carrier fixed to the engine frame;

a plurality of planet gears mounted in the planet gear carrier in operative engagement with the sun gear;

a bell gear mounted for rotation in operative engagement with the planet gears and having a shaft extending therefrom to provide the output of said gear reduction system; and a torque converter, through which power may be transmitted, having a fluid chamber, a drive impeller mounted in the fluid chamber and operatively connected to the output shaft of the gear reduction system, an output turbine rotatably mounted in the fluid chamber and operatively connected to the fan, a variable geometry stator mounted in the fluid chamber to control the transmission of power from the impeller to the turbine to vary the speed of the output turbine, and means to supply fluid to said chamber.

2. A composite gas turbine engine propulsion system for aircraft as described in claim 1 further comprising:

a means operatively connected between the torque converter output turbine and the torque converter impeller to selectively lock said elements together for mutual rotation.

3. A composite gas turbine engine propulsion system for aircraft as described in claim 1 wherein the first transmission means includes a pair of bevel gears, one bevel gear fixed to the drive shaft and a second bevel gear operatively engaging said first bevel gear, said second bevel gear having an axis of rotation transverse to the axis of said first bevel gear, said second bevel gear having an output shaft operatively connected to the external load.

4. A composite gas turbine engine propulsion system as described in claim 1 wherein the fixed planet gear carrier is connected to a shaft which extends into the torque converter and provides a fixed structure upon which the output turbine of the torque converter is rotatably mounted.

5. A composite gas turbine engine propulsion system as described in claim 1 further comprising means to selectively disengage the output of the first transmission from the external load under certain conditions.

6. A composite gas turbine engine propulsion system as described in claim 5 wherein the means to disengage comprises a clutch.

7. A composite gas turbine engine propulsion system as described in claim 1 further comprising means to vary the power used by the external load in response to variations in the operation of the fan.

8. A composite gas turbine engine propulsion system as described in claim 1 wherein the fan is mounted on the axis of the engine in a forward position relative to the air flow through the engine and is constructed with a forward extending spinner hub projecting into the oncoming airstream; said torque converter being mounted within said spinner hub and said spinner hub constructed with means to provide cooling air to the torque converter.

9. A composite gas turbine engine propulsion system as described in claim 2 wherein the means to connect the torque converter output turbine to the torque converter drive impeller comprises a clutch.

10. A composite gas turbine engine propulsion system for aircraft as described in claim 1 wherein the external load comprises a rotor constructed to provide lift for a rotary wing aircraft and having means to vary the load absorbed thereby in response to the operation of the fan.

11. A composite gas turbine engine propulsion system for aircraft as described in claim 1 wherein the fan is constructed with blades having a fixed pitch.

* * * * *